(12) United States Patent
Newhall, Jr. et al.

(10) Patent No.: US 8,803,879 B1
(45) Date of Patent: *Aug. 12, 2014

(54) OMNIDIRECTIONAL SHADOW TEXTURE MAPPING

(75) Inventors: William P. Newhall, Jr., San Francisco, CA (US); Mark J. Kilgard, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/073,142

(22) Filed: Mar. 4, 2005

Related U.S. Application Data

(63) Continuation of application No. 10/193,388, filed on Jul. 10, 2002, now Pat. No. 6,876,362.

(51) Int. Cl.
*G06T 15/50* (2011.01)
*G06T 15/00* (2011.01)
*G06T 15/40* (2011.01)
*G09G 5/00* (2006.01)

(52) U.S. Cl.
USPC ........... 345/426; 345/419; 345/422; 345/582; 345/620; 345/622

(58) Field of Classification Search
USPC .................. 345/419, 422, 426, 582, 620, 627
See application file for complete search history.

(56) References Cited

U.S. PATENT DOCUMENTS

| | | | |
|---|---|---|---|
| 5,268,996 A | 12/1993 | Steiner et al. | 345/426 |
| 5,490,240 A | 2/1996 | Foran et al. | 345/430 |
| 5,616,031 A | 4/1997 | Logg | |
| 5,737,031 A | 4/1998 | Tzidon et al. | |
| 5,742,292 A | 4/1998 | Murata | |
| 5,742,749 A | 4/1998 | Foran et al. | |
| 5,767,858 A | 6/1998 | Kawase et al. | 345/430 |
| 5,805,782 A * | 9/1998 | Foran | 345/426 |
| 5,880,736 A | 3/1999 | Peercy et al. | |
| 5,999,185 A | 12/1999 | Kato et al. | |
| 6,034,691 A | 3/2000 | Aono et al. | 345/425 |
| 6,078,332 A | 6/2000 | Ohazama | 345/426 |
| 6,208,361 B1 | 3/2001 | Gossett | |
| 6,252,608 B1 | 6/2001 | Snyder et al. | |
| 6,774,895 B1 | 8/2004 | Papakipos et al. | |
| 6,876,362 B1 | 4/2005 | Newhall, Jr. et al. | 345/426 |
| 6,903,741 B2 * | 6/2005 | Corbetta | 345/426 |

(Continued)

OTHER PUBLICATIONS

Watt et al., Advanced Animation and Rendering Techniques Theory and Practice, 1992, ACM Press, pp. 155-177.*

(Continued)

*Primary Examiner* — Jeffrey Chow

(57) ABSTRACT

An invention is provided for rendering using an omnidirectional light. A shadow cube texture map having six cube faces centered by a light source is generated. Each cube face comprises a shadow texture having depth data from a perspective of the light source. In addition, each cube face is associated with an axis of a three-dimensional coordinate system. For each object fragment rendered from the camera's perspective a light-to-surface vector is defined from the light source to the object fragment, and particular texels within particular cube faces are selected based on the light-to-surface vector. The texel values are tested against a depth value computed from the light to surface vector. The object fragment is textured as in light or shadow according to the outcome of the test.

20 Claims, 9 Drawing Sheets

(56) References Cited

U.S. PATENT DOCUMENTS

| | | | |
|---|---|---|---|
| 7,508,390 | B1 | 3/2009 | Demers |
| 8,462,156 | B1 | 6/2013 | Fernando |
| 2004/0239673 | A1 | 12/2004 | Schmidt |
| 2006/0044322 | A1 | 3/2006 | Chen et al. |

OTHER PUBLICATIONS

IDS for Application No. 10/022,133, Patent No. 6903741, 04032002.*
Dietrich, "Shadow Techniques", Nvidia Corporation, Technical presentation, www.nvidia.com/developer, GDC 2001 Presentation, before Apr. 3, 2002.*
Ronald Frazier, "Index Cube Shadow Mapping in OpenGL" Sep. 13, 2000 www.ronfrazier.net/apparition.*
Kilgard, 'Improving Shadows And Reflection via the Stencil Buffer', Nvidia Corporation, Technical presentation, www.nvidia.com/developer, before Apr. 3, 2002.*
Reeves et al., "Rendering Antialiased Shadows with Depth Maps", SIGGRAPH '87 Proceedings, Jul. 1987, 21(4), pp. 283-291.*
Wynn et al., "CubeMaps", Nvidia Corporation, Technical presentation, www.nvidia.com/developer, before Apr. 3, 2002.*
Kilgard, "A Practical and Robust Bump-mapping Technique for Today's GPUs", Jul. 5, 2000.*
Schrocker, "Hardware Accelerated Per-Pixel Shading", Feb. 27, 2002.*
"Direct Volume Rendering with Shading via Three-Dimensional Textures" by Gelder and Kim, IEEE, 1996.
"Computer Graphics Principles and Practices", by J. Foley and A. Van Dam, 2$^{nd}$ Edition, 1990.
"Computer Graphics", by Donald Hearn and M. Pauline Baker, 2$^{nd}$ Edition, 1994.
James Foley, Andries van Dam, Steven Feiner and John Huges; Computer Graphics Principles and Practice, second edition. 1990 by Addison-Wesley Publishing Company, Inc.
Donald Hearn and M. Pauline Baker; Computer Graphics, second edition. 1994, 1986 published by Prentice Hall, Inc. Englewood Cliffs, New Jersey.
Agrawala et al., Efficient Image-Based Methods for Dendering Soft Shadows, pp. 375-384.
Fernando, P., Adaptive Techniques for Hardware Shadow Generation, pp. 1-94.
Michell, J., Shaders, Mar. 2005, pp. 1-41.
Nealen, Andrew, Shadow Mapping and Shadow Volumes, pp. 1-10.
Pago, C., Multiple-Depth Shadow Maps, pp. 1-8.
Ronald Frazier; "Real-Time Per-Pixel Point Lights and Spot Lights in OpenGL"; Sep. 13, 2000.
Ronald Frazier; "Advanced Real-Time Per-Pixel Point Lights and Spot Lights in OpenGL"; Sep. 13, 2000.
Ronald Frazier; "Index Cube Shadow Mapping in OpenGL"; Sep. 13, 2000.
Hasenfratz, J., Lapierre, M., Holzschuch, N., Sillion, F., A Survey of Real-time Soft Shadows Alogrithms, Dec. 2003, Eurographics, Computer Graphics Forum, vol. 22, N. 4, pp. 753-774.
"Vertex Shader Shadow Volume" NVIDIA Effect Browser, 1999.
Bergeron; "A General Version of Crow's Shadow Volumes"; IEEE Interactive Computer Graphics and Application; Sep. 1986.
Blin; Me and My (Fake) Shadow, pp. 82-86, 1988.
Crow; Shadow Algorithms for Computer Graphics; pp. 242-248, 1977.
Diefenbach; "Pipeline Rendering: Interactive Refractions, Reflections, and Shadows"; pp. 173-180, 1994.
Heckbert et al., Simulating Soft Shadows with Graphics Hardware; Technical Report CMU-CS-97-104, 1997.
Hubert, Castng Shadows on Volumes; Game Developer, vol. 6, 1999.
Parker et al.; Single Sample Soft Shadows; 1998.
Sander et al., "Silhouette Clipping"; pp. 327-334, 2000.
Udeshi et al., "Towards Interactive Photorealistic Rendering of Indoor Scenes: A Hybrid Approach" pp. 63-76, 1999.
Williams; "Casting Curvered Shadows on Curved Surfaces", 1978.

* cited by examiner

OMNIDIRECTIONAL SHADOW TEXTURE MAPPING

RELATED APPLICATION

This application is a Continuation of commonly-owned U.S. patent application Ser. No. 10/193,388, filed Jul. 10, 2002, now U.S. Pat. No. 6,876,362 entitled "Omnidirectional Shadow Texture Mapping" to Newhall et al.

BACKGROUND OF THE INVENTION

1. Field of the Invention

The present invention relates generally to computer graphics shading and more specifically to omnidirectional shading using a shadow texture cube mapping.

2. Description of the Related Art

Real-time computer image systems are designed to provide realistic image reproduction for a wide variety of graphics systems, such as flight simulators, action games, and engineering workstations. For example, graphics-based simulators can be used as training devices, which permit combatants to obtain practice without the necessity of going out into the field and using the actual combat systems. The simulators enable a user, such as a pilot, to maintain and improve their skills without the cost associated with live training. As such, it is advantageous to provide the user with video display realism.

FIG. 1 is a diagram showing a three-dimensional (3D) viewing space 100. When creating three-dimensional computer generated graphics, 3D objects 104 are rendered from a camera's 102 point of view, generally between a near plane 106 and a far plane 108. In addition, a light source 110 is provided for shading and illumination. During rendering, each 3D fragment of the 3D objects is projected onto the near plane 106, resulting in a two-dimensional (2D) image that can be displayed on a computer monitor.

For realistic image rendering, the 3D objects 104 are analyzed for shading and illumination with respect to the light source 110. Specifically, pixels that are occluded from the light source 110 generally are given darker pixel shadings than pixels not occluded from the light source 110. Thus, "shadows" are created based on each object's position with respect to other objects and the light source 110. Currently, developers utilize several techniques to determine shading in 3D rendering. Two such techniques are shadow volumes and shadow texturing. Additional information on shadow volumes and shadow texturing can be found in Crow, F. C., Shadow Algorithms for Computer Graphics, *Computer Graphics*, 11(3), 242–8, (Proc. SIGGRAPH '77), and Williams, L., Casting Curved Shadows on Curved Surfaces. *Computer Graphics*, 12(3), 270–4, (Proc. SIGGRAPH '78), which are each incorporated herein by reference.

FIG. 2 is an illustration showing a conventional shadow volume space 200 utilized for shading during 3D rendering. A shadow volume space 200 is generated based on a light source 110 and an occluding polygon 202. In particular, the shadow volume space 200 is generated by forming a volume from the light source 110 through the vertices of the occluding polygon 202, such that the projection of the edges of the occluding polygon 202 constrain the shadow volume space 200. Thereafter, when rendering other objects, such as polygon 204, pixels inside the shadow volume space 200 are shaded by the occluding polygon 202, and pixels outside the shadow volume space 200 are not shaded by the occluding polygon 202.

Unfortunately, the construction of each shadow volume space 200 is performed by the central processing unit (CPU) of a computer. Hence, the computing intensity on the CPU increases as the number of edges an object has increases. As a result, objects having many curves, and thus many edges, increase the amount of CPU processing time needed for rendering. Although curved objects are often described using few vertex points that are later interpolated to create the curve, each interpolated edge requires CPU processing to create the shadow volume space 200 for that object. To avoid problems resulting from shadow volumes, many developers utilize shadow texturing for shading.

As is well known in the prior art, modeling is the transformation from object coordinates to world coordinates. To account for the camera's view of the 3D objects within the world coordinate system, a viewing transformation is applied. A projection transformation maps points within a view frustum to a normalized viewing volume and a viewport transformation maps (x,y) coordinates from within the normalized viewing volume to the screen coordinates of the viewport. Further information regarding computer 3D modeling can be found in *Computer Graphics Principles and Practices* by Foley, et al., which is incorporated by reference. This cited reference contains background on other relevant terms such as modeling, viewing, projection, and viewport transformations as well as viewing, projection, and viewport transformations along with scan conversion, depth-testing, pixel shading, texturing, (and conventional cube mapping).

FIG. 3 is an illustration showing a 3D viewing space 300 based on shadow texturing. As above, the 3D objects, here a sphere 306 on a plane 308, are rendered from the camera's 102 point of view, generally between a near plane 106 and a far plane 108, with a light source 110 for shading and illumination. During rendering, each 3D fragment of the 3D objects is projected onto the near plane 106, resulting in a two-dimensional (2D) image that can be displayed on a computer monitor.

Before rendering from the camera's view 102, the 3D objects 306 and 308 are rendered from the perspective of the light source 110 using a depth buffer 302. In particular, the depth buffer 302 is located at the near plane for the light source 110. The light source also has a far plane 304, similar to the camera's far plane 108. To create the depth buffer 302, a range is measured from each pixel on the 3D objects 306 and 308 to the light source 110. This range is then recorded at a projected position within the depth buffer 302. If a subsequent range is determined for the same location within the depth buffer, the range closest to light source is recorded. For example, pixel 306' of the sphere 306 is projected on the near plane of the light source 110 at location 306". The range between the pixel 306' and the light source 110 is then recorded at location 306" in the depth buffer 302. A similar operation is performed for pixel 308' of the plane 308, which is projected on the near plane of the light source 110 at location 308". The depth buffer 302 thereafter is copied to a shadow texture, as described next with reference to FIG. 4.

FIG. 4 is a diagram showing an exemplary shadow texture 400 for a light source. The shadow texture 400 corresponds to the depth buffer 302 of FIG. 3, and includes a plurality of range values corresponding to pixel ranges to the light source. Hence, the shadow texture 400 locations corresponding to the sphere 306" have values nearer to the light source 110 than shadow texture 400 locations corresponding to the plane 308".

Referring back to FIG. 3, the 3D objects 306 and 308 are then rendered from the camera's perspective and shaded using the shadow texture 400. In particular, each object 306 and 308 initially is rendered assuming no occlusion from the light source. Thereafter, each pixel is examined to determine shading. Specifically, for each object surface pixel, the range from the light source 110 to the pixel is determined. In addition, the object pixel is projected onto the near plane of the light source 110, thus transforming its location from a 3D point to a 2D point within the depth buffer 302. The 2D coordinates of the projected point then are used to index into the shadow texture 400 to obtain the stored range value. If the range value from the shadow texture 400 is closer to the light source than the range from the current object surface pixel, the current object surface pixel is shaded. Otherwise, no occluding objects are located between the current object surface pixel and the light source and the object surface pixel is not shaded.

Although shadow texturing works well for light sources that are essentially spotlights that cast shadows in one direction, conventional shadow texturing generally does not work well for omnidirectional light sources, which may cast shadows in all directions. To do so requires a plurality of shadow texture lookups for each pixel rendered, resulting in greatly increased processor time and reduced performance. That is, a shadow texture would be required for each direction from the light source, and all the shadow textures would need to be examined for each pixel rendered. In current processors, such a multi-texture lookup is unworkable in a real-time environment.

As is well known in the prior art, Cube Texture Mapping provides a mechanism for omnidirectional reflection mapping wherein a three dimensional texture coordinate(representing a reflection vector) is transformed into a Cube Face Identifier(selecting one of six cube face two dimensional texture maps) and a two dimensional texture coordinate(selecting a particular texel within the selected two dimensional texture map) though Cube Texture Mapping can accept any 3D vector as texture coordinate input(including a light to surface vector) the practice as known in the state of the art collapses the 3D vector into a 2D vector and a face identifier—thereby losing the necessary depth information to perform shadow texturing. Additional information on Cube Texture Mapping can be found in Greene, N., Environment Mapping and Other Applications of World Projections, *IEEE Computer Graphics and Applications*, 6(11), 21–9, November 1986, which is incorporated herein by reference.

In view of the foregoing, there is a need for systems and methods for omnidirectional shadow texture mapping in real-time systems. The methods should provide omnidirectional shadow texture mapping without requiring multiple texture lookups or greatly increased CPU processing time for objects having a large number of edges, such as curved objects.

SUMMARY OF THE INVENTION

Broadly speaking, the present invention fills these needs by providing omnidirectional shadow texture mapping using a shadow cube texture map, which allows omnidirectional shading using a single texture lookup. In one embodiment, a method is disclosed for rendering using an omnidirectional light source. A plurality of depth buffers is generated. Each depth buffer corresponds to the light source and includes depth data from a perspective of the light source. A particular depth buffer is selected from the plurality of depth buffers based on a location of an object fragment in relation to the light source. The object fragment can then be rendered utilizing the selecting depth buffer. In one aspect, the plurality of depth buffers is defined using a shadow cube texture map that defines a virtual six plane cube centered on the light source.

Typically, each plane of the shadow cube texture map can be associated with an axis of a three-dimensional coordinate system.

In a further embodiment, a system for rendering using an omnidirectional light source is disclosed. The system includes a pixel processor that transforms a 3D texture coordinate into a 2D texture coordinate, a depth range value, and a face identifier. The face identifier specifies a particular shadow texture of a plurality of shadow textures, while the 2D texture coordinate specifies at least one texel of a plurality of texels within the selected shadow texture. In communication with the pixel processor is a texture unit that receives the 2D texture coordinate, the face identifier, and the depth range value. Using the 2D texture coordinate, the texture unit obtains a stored range value from a cube face that corresponds to the face identifier. In addition, the texture unit provides at least one color value based on a comparison of the stored range value to the received depth range value for each pixel processed by the pixel processor. As above, the plurality of shadow textures can be stored using a shadow cube texture map that defines a virtual six plane cube centered by the light source. In one aspect, the pixel processor generates the face identifier utilizing a light-to-surface vector that is defined from a light source to the object fragment. To do this, the pixel processor can select a component of the light-to-surface vector having a larger absolute value than other components of the light-to-surface vector. The face identifier can then correspond to the plane of the shadow cube texture map associated with an axis of the selected component.

A further method for rendering using an omnidirectional light source is disclosed in a further embodiment of the present invention. A shadow cube texture map having six cube faces centered on a light source is generated. Each cube face comprises a shadow texture having depth data from a perspective of the light source. As above, each cube face is associated with an axis of a three-dimensional coordinate system. A light-to-surface vector is defined from the light source to an object fragment, and a particular cube face of the shadow cube texture map is selected based on the light-to-surface vector. The object fragment is then rendered utilizing the shadow texture corresponding to the selected cube face. As above, a component of the light-to-surface vector having a larger absolute value than other components of the light-to-surface vector can be selected. Then, the particular cube face associated with an axis of the selected component can be selected. In addition, coordinate parameters can be normalized using a Scale value and a Bias value. For example, the Scale value can equal $-(Far*Near)/(Far-Near)$, and the Bias value can equal $Far/(Far-Near)$, where Far is a range value from the light source to a far plane for the light source and Near is a range value from the light source to a near plane for the light source. In addition, Scale and Bias values associated with the particular cube face can be selected from a plurality of Scale and Bias values so that each depth image can be rendered with a projection transformation tailored to the field of view of the corresponding cube face. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for omnidirectional shadow texture mapping via a shadow cube texture map. Using the shadow cube texture map, embodiments of the present invention allow omnidirectional shading using a single texture lookup. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Broadly speaking, the embodiments of the present invention provide an enhanced form of Cube Texture Mapping which transforms a three dimensional vector (representing a light-to-surface vector) into a Cube Face Identifier (selecting one of six cube face two dimensional texture maps), a two dimensional texture coordinate (selecting a particular texel within the selected two dimensional texture map), and a normalized range value which can be used for the shadow texturing.

Figure 1:
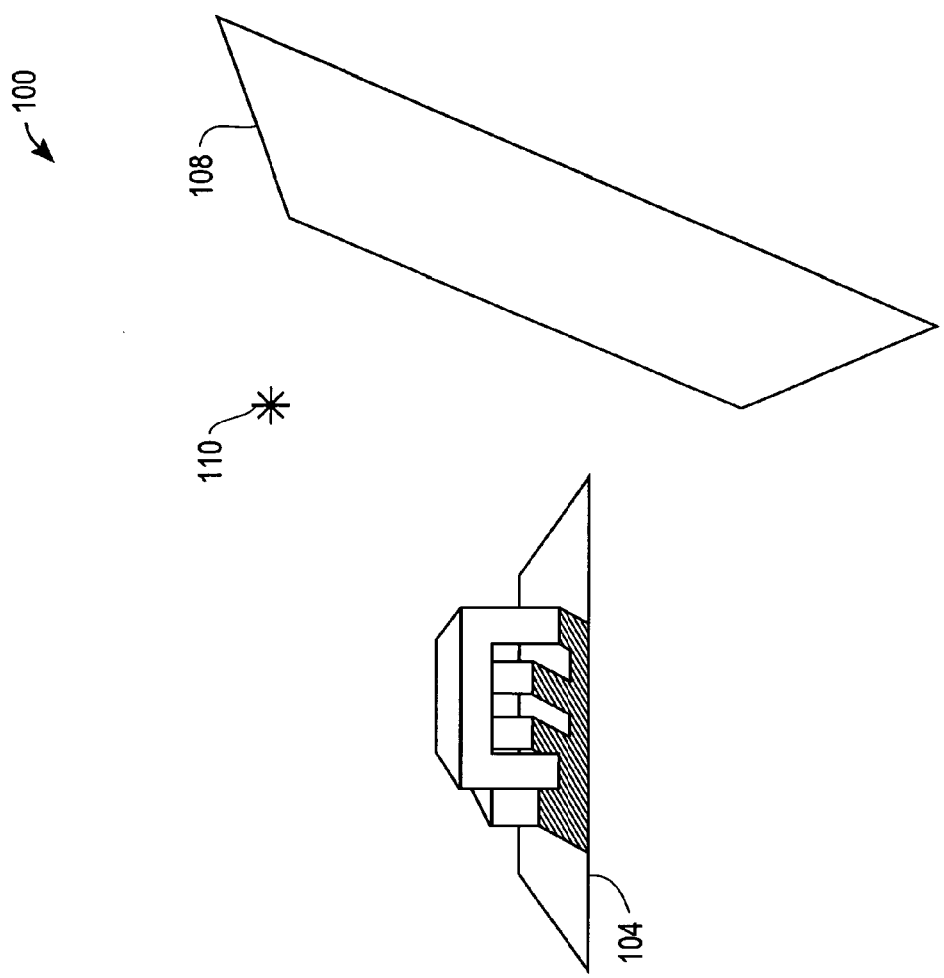
FIG. 1 is diagram showing a three-dimensional (3D) viewing space.
Figure 2:
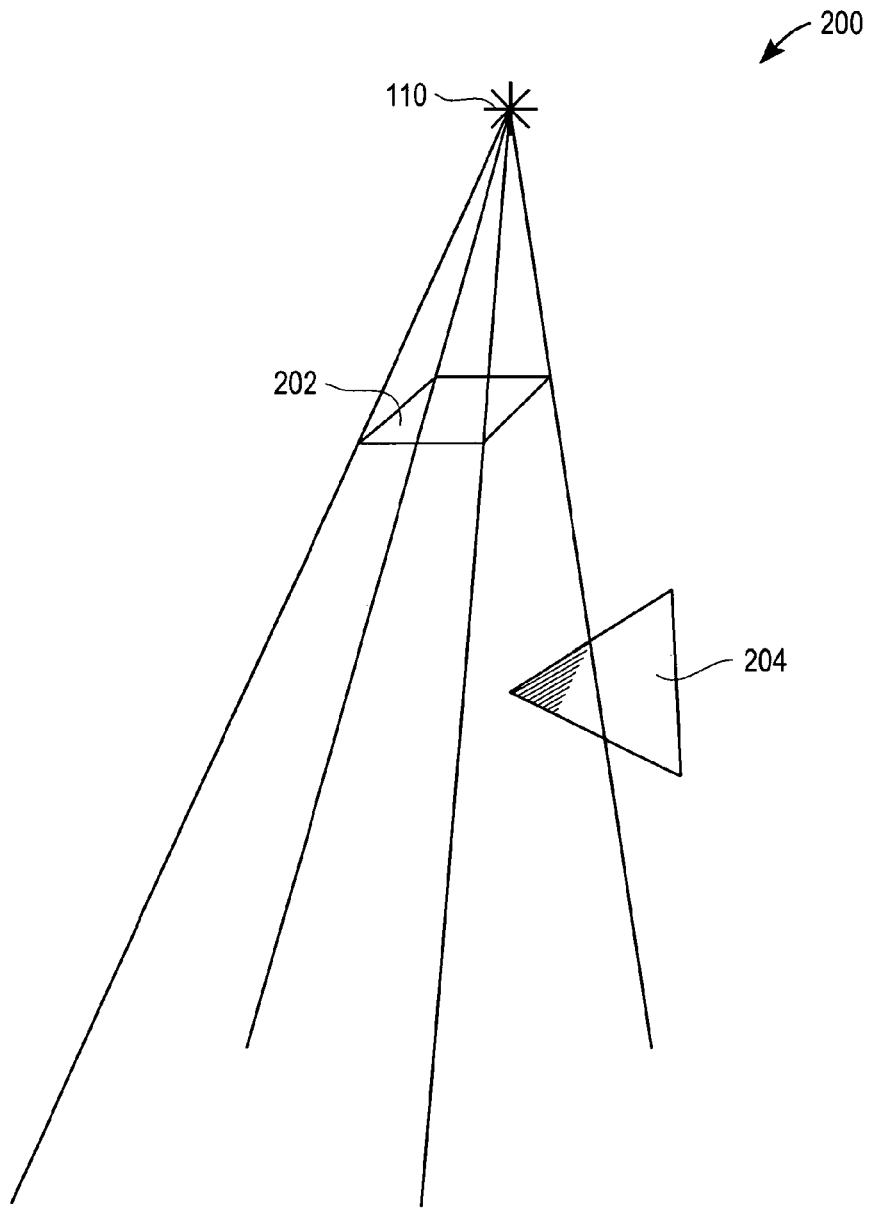
FIG. 2 is an illustration showing a conventional shadow volume space utilized for shading during 3D rendering.
Figure 3:
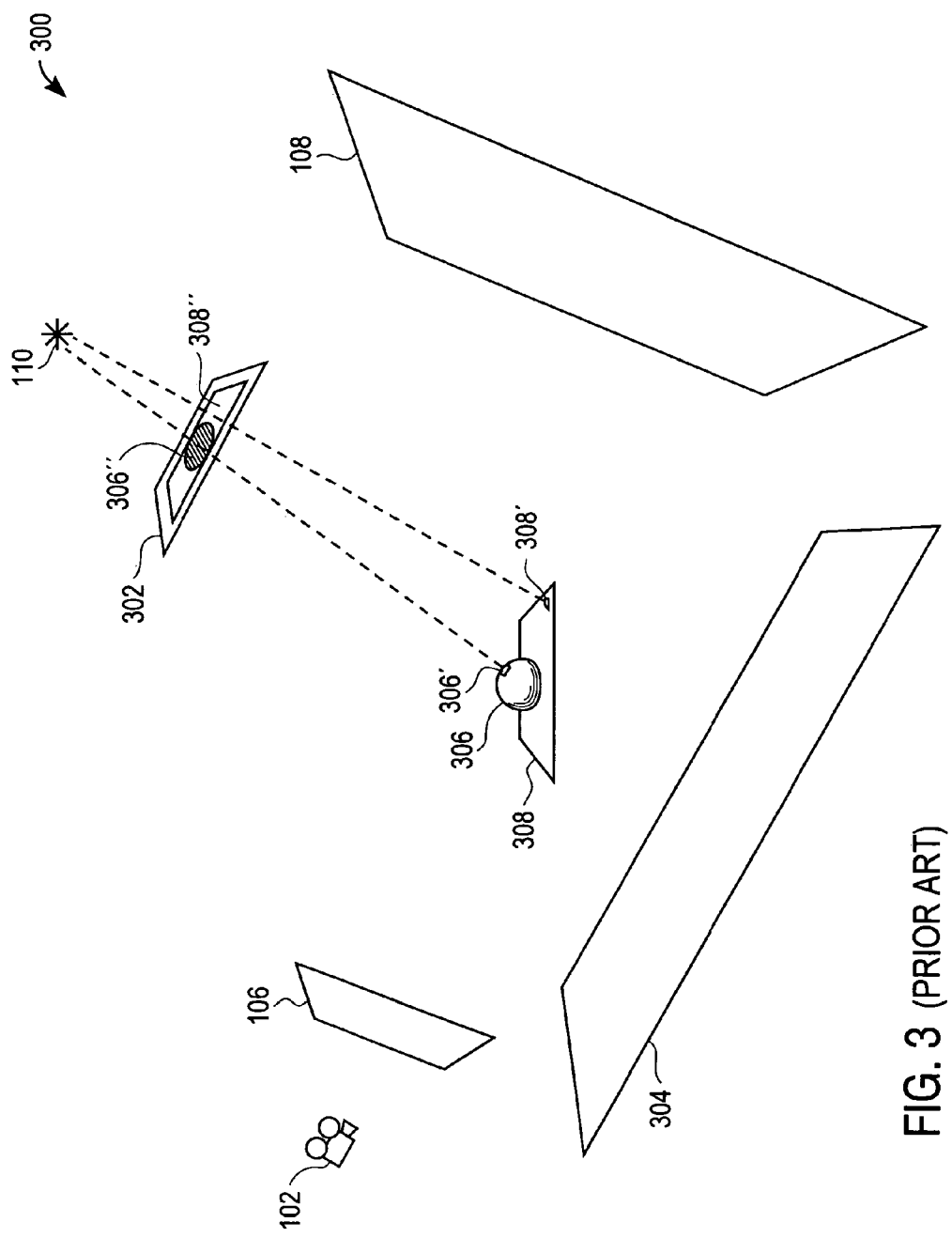
FIG. 3 is an illustration showing a 3D viewing space based on shadow texturing.
Figure 4:
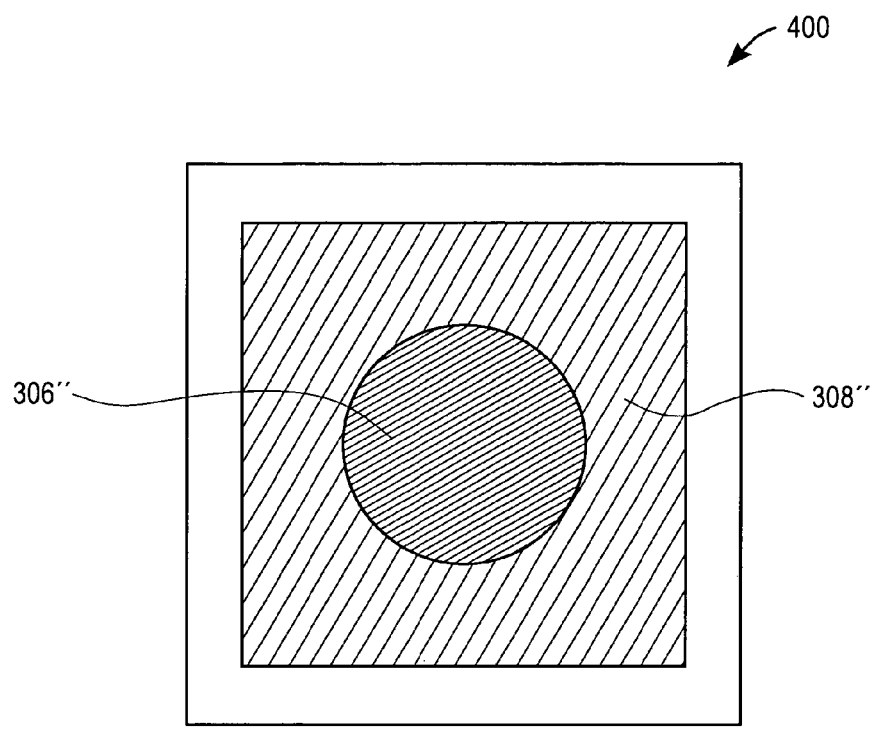
FIG. 4 is a diagram showing an exemplary shadow texture for a light source.
Figure 5:
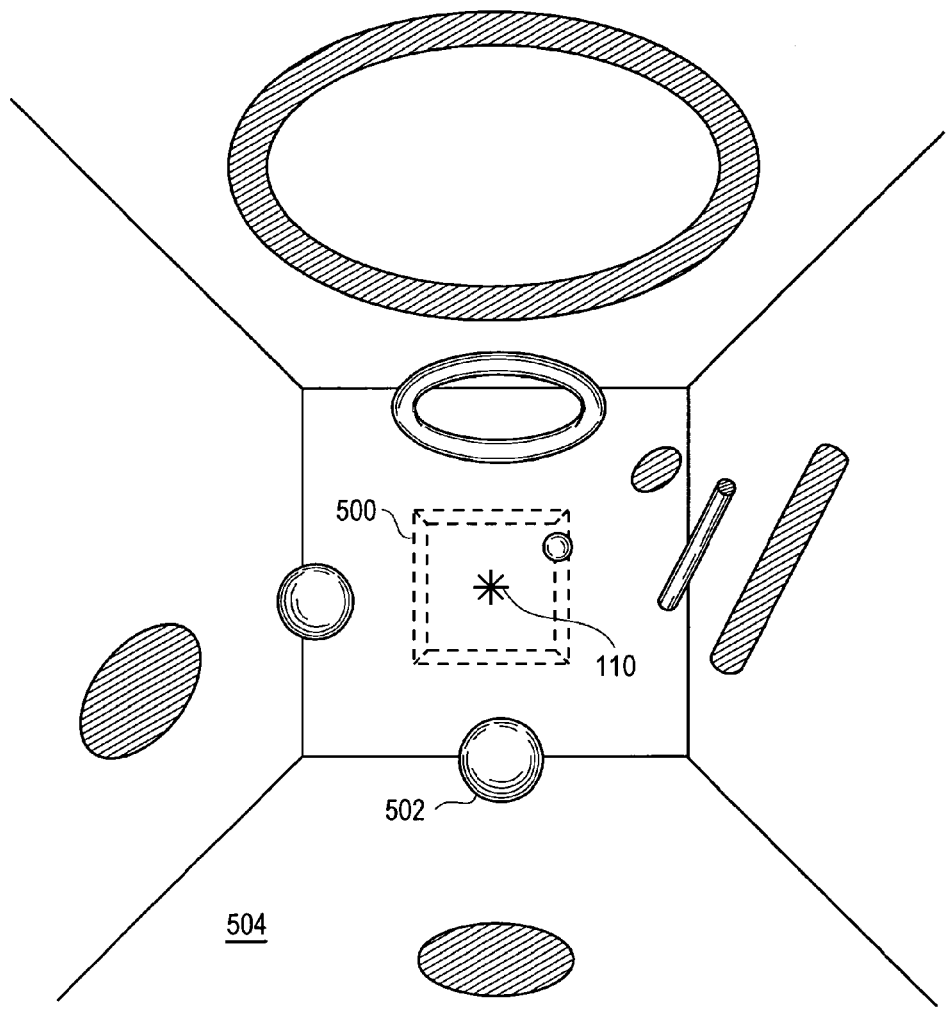
FIG. 5 is an illustration showing an omnidirectionally lit scene using a shadow cube texture map, in accordance with an embodiment of the present invention.

FIGS. 1–4 were described in terms of the prior art. FIG. 5 is an illustration showing an omnidirectionally lit scene using a shadow cube texture map 500, in accordance with an embodiment of the present invention. FIG. 5 illustrates how embodiments of the present invention allow shading in all directions from an omnidirectional light source 110. Broadly speaking, embodiments of the present invention utilize a shadow cube texture map 500 to store a plurality of shadow textures that are later used to determine shading for a scene. More particularly, a shadow texture is generated from the perspective of the light source 110 through each of the six faces of the shadow cube texture map 500. In subsequent object rendering, a light-to-surface vector is determined from the light source to each object fragment, which is the location on the surface of an object corresponding to a pixel being rendered. It should be noted that the light-to-surface vector can also be determined from each object fragment to the light source. The light-to-surface vector is used to select the appropriate face of the shadow cube texture map for use in rendering the object fragment.

In this manner, each object fragment can be rendered for the omnidirectional light source 110 using a single texture lookup. As a result, the omnidirectional light source 110 can cast shadows in all directions without requiring multiple texture lookups or greatly increased CPU processing time for objects having a large number of edges, such as curved objects.

Figure 6:
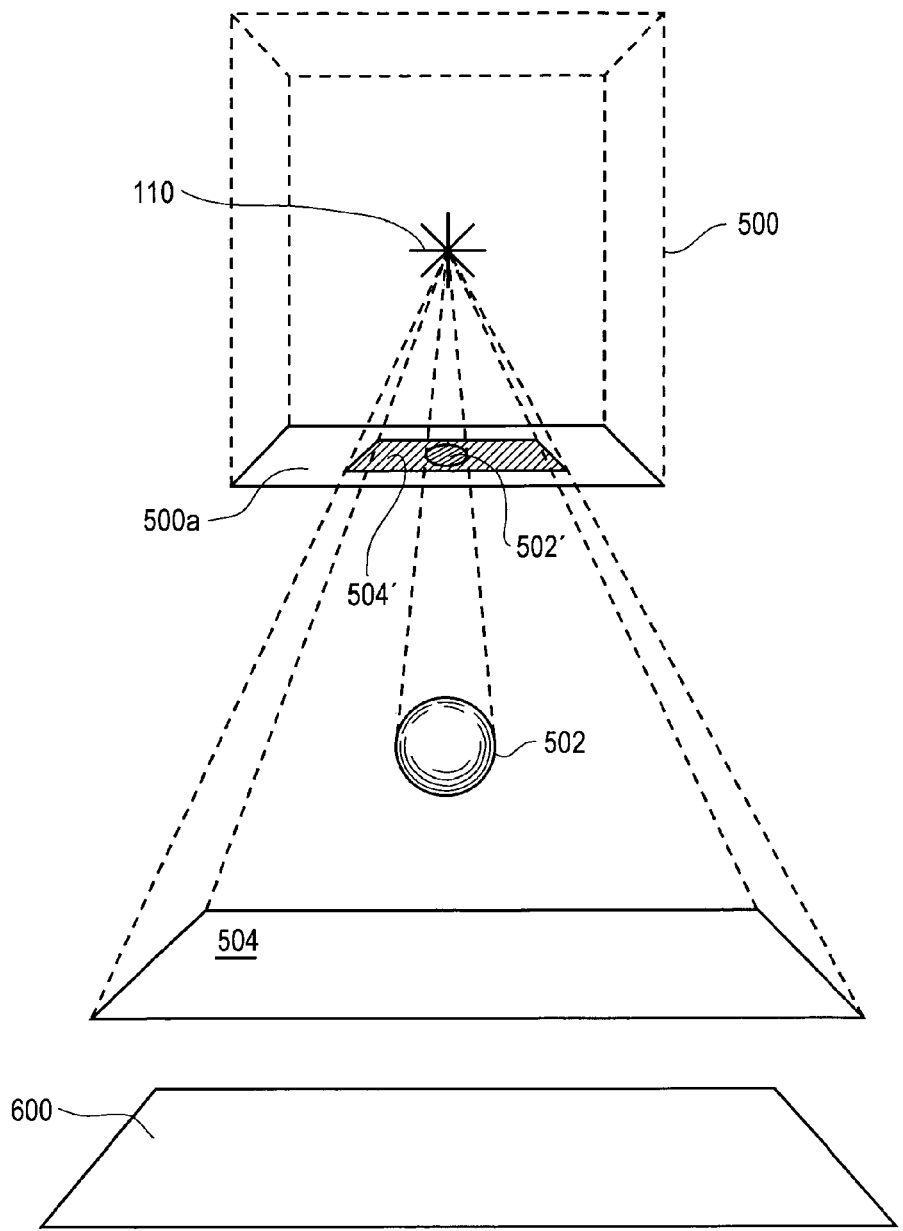
FIG. 6 is a diagram showing shadow texture rendering for a shadow cube texture map face, in accordance with an embodiment of the present invention.

FIG. 6 is a diagram showing shadow texture rendering for a shadow cube texture map face, in accordance with an embodiment of the present invention. As mentioned previously, a shadow texture is generated from the perspective of the light source 110 through each of the six faces of the shadow cube texture map 500. For example, when rendering cube face 500a, object fragments between the cube face 500a and the far plane 600 of the light source 110 are projected onto the cube face 500a. As mentioned previously, for each object fragment, the range from the light source 110 to the object fragment is computed and normalized using projection and viewport transformations of a standard graphics pipeline. In addition, the object fragment is projected onto the near plane of the light source 110, which is the cube face being rendered. In this manner, the 3D point location of the object fragment is transformed into a 2D point within the cube face shadow texture. The current range value then is stored in a cube face shadow texture if the current range value is closer to the light source 110 than any previously stored range value already present at the projected location within the cube face shadow texture.

For example, when generating cube face 500a, the range value for each object fragment of the sphere 502 is determined and stored in the cube face 500a shadow texture at the projected location. Generally, the range from the cube face 500a to the far plane 600 is normalized, such that the cube face has a range of zero and the far plane has a range of one. Hence, the values stored in the cube face 500a shadow texture indicate distances within this normalized range. Although embodiments of the present invention will be described having normalized ranges between zero and one, it should be noted that other normalized ranges can be used with the embodiments of the present invention. For example, ranges can be normalized from −1.0 to 0.0, or −1.0 to 1.0, or any other normalized range suitable for use in 3D graphics rendering.

Thus, in the example of FIG. 6, the ranges for the sphere 502 object fragments will be closer to the light source 110 than ranges for the plane 504 object fragments. As a result, the range values stored in the cube face 500a shadow texture corresponding to projected sphere object fragments 502' will be smaller than range values stored for projected plane object fragments 504'. In this manner, each cube face of the shadow cube texture map is rendered into a cube face shadow texture for use in omnidirectional shading.

Figure 7:
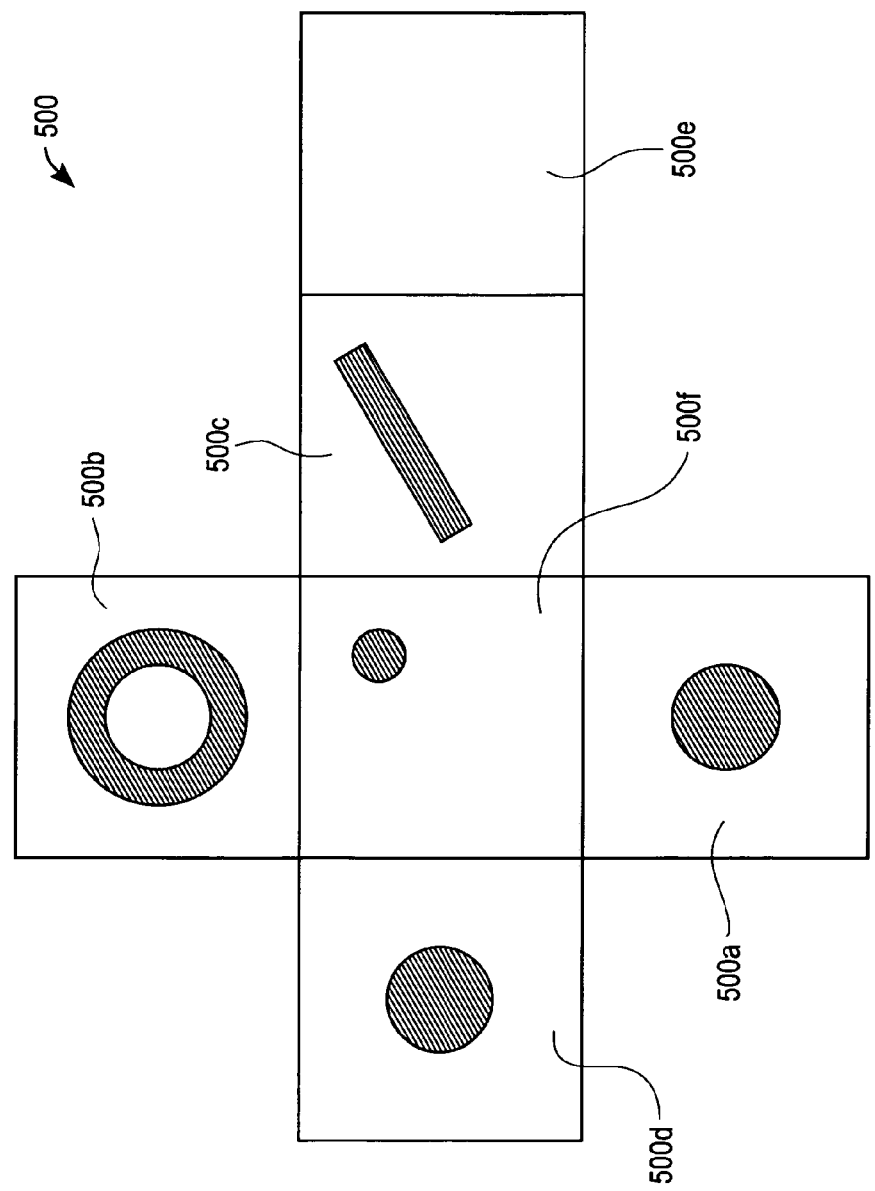
FIG. 7 is a diagram showing an exemplary shadow cube texture map, in accordance with an embodiment of the present invention.

FIG. 7 is a diagram showing an exemplary shadow cube texture map 500, in accordance with an embodiment of the present invention. In particular, the shadow cube texture map 500 of FIG. 7 illustrates an "unfolded" view of the shadow cube texture map 500 of FIG. 5 after the cube face shadow textures have been generated. Broadly speaking, each depth buffer is drawn with a projection transformation where fovx and fovy are both 90 degrees and thereforce subtend one sixth of the total field of view of the omnidirectional light source. In addition, each depth value within the depth buffer is computed by applying a projection and viewport transformation which scales, biases, and clamps the reciprocal of the depth value to a normalized range (i.e., from 0.0 to 1.0 where 0.0 is the near plane and 1.0 is the far plane) to constrain the range of fragments within the view frustum to the precision of the rendering hardware. Each cube face corresponds to an axis of the 3D world coordinate system. In the example of FIG. 7, cube face 500a corresponds to the −y axis and cube face 500b corresponds to the +y axis. In addition, cube face 500c corresponds to the +x axis, cube face 500d corresponds to the −x axis, cube face 500e corresponds to the +z axis, and cube face 500f corresponds to the −z axis.

As mentioned previously, each cube face shadow texture 500a–500f includes normalized range values for object fragments projected through the particular cube face to the light source. Each cube face 500a–500f generally is described in its own normalized coordinate system. Hence, normalized coordinate values are utilized to index into each cube face shadow texture. In operation, embodiments of the present invention provide object shading by selecting a cube face that corresponds to the direction of the object fragment from the light source. The selected cube face shadow texture is then used to facilitate rendering of the object fragment, as described next with reference to FIG. 8.

Figure 8:
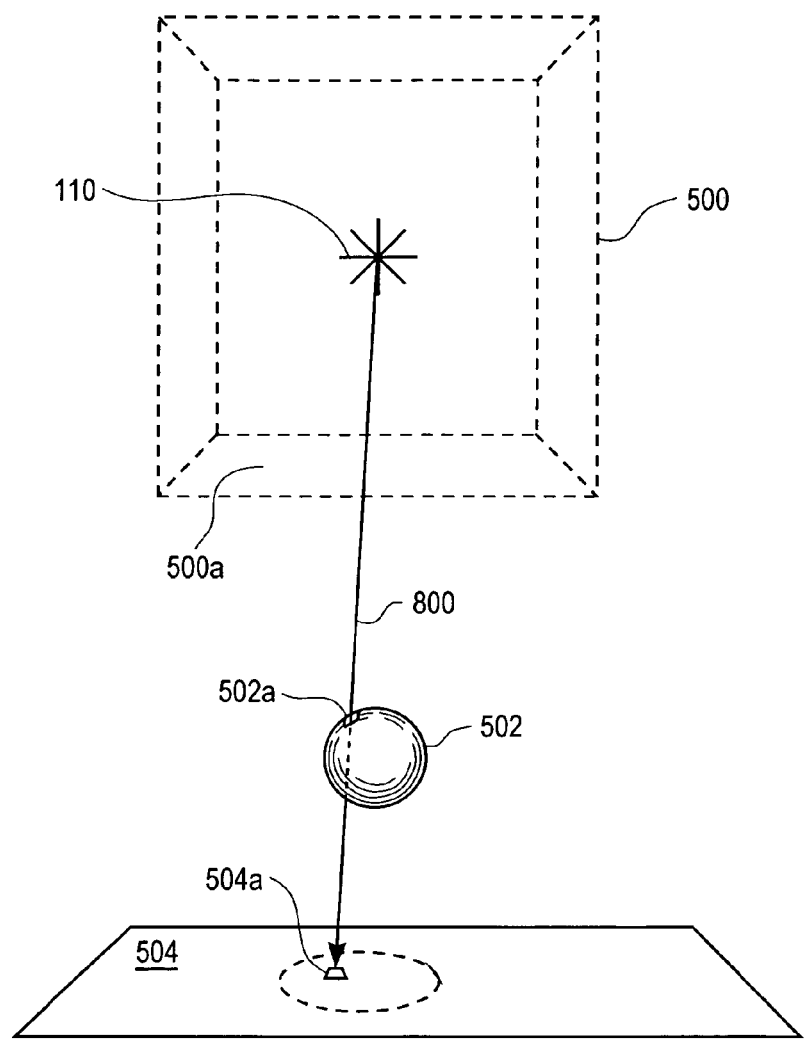
FIG. 8 is a diagram showing cube face selection, in accordance with an embodiment of the present invention.

FIG. 8 is a diagram showing cube face selection, in accordance with an embodiment of the present invention. When rendering a 3D scene, embodiments of the present invention initially render the scene from the camera's perspective assuming no occlusion. That is, lighting values are computed, either per vertex or per pixel, assuming that light from the light source can reach the object without interfering with objects in the light source's line of sight (LOS) to the object.

3D Objects generally are described using an object coordinate system, wherein the origin of the object coordinate system is located at the center of the object being described. Thus, each 3D object initially is described using its own coordinate system. To create a 3D scene, each object is oriented within a world coordinate system. Often, the transformation from object coordinates to world coordinates is referred to as modeling. A viewing transformation is then utilized to account for the camera's view of the 3D objects within the world coordinate system. A projection transformation maps points within the view frustum to the normalized viewing volume, and the viewport transformation maps (x,y) coordinates from within the normalized viewing volume to the screen coordinates of the viewport and transforms the signed normalized depth value to the range used by the depth test.

When rendering from the perspective of the camera on a per-pixel basis, the 3D vector from the light source to the object fragment is computed and used as a 3D texture coordinate (S,T,R) to select particular depth values from particular depth buffers using an enhanced cube mapping transformation. The enhanced cube mapping transformation takes the 3D vector as input and computes a face id (selecting which depth buffer to read from), 2D texture coordinates S' and T' (selecting which texel(s) to read from within the depth buffer), and a depth R' which will be compared against the range stored within the selected depth buffer at the selected texels to determine whether the fragment is visible and illuminated by the light source.

To determine the proper cube face to use when shading, a light-to-surface vector 800 is determined that is defined from the light source to the object fragment. Hence, the light-to-surface vector 800 is a vector having an origin at the light source. To differentiate the coordinates of the light-to-source vector 800 in the following description, the texture coordinate S will be used to represent the x-coordinate, the texture coordinate T will be used to represent the y-coordinate, and the texture coordinate R will be used to represent the z-coordinate of the light-to-source vector 800. The S and T coordinates will also be used to describe coordinates within the 2D cube face shadow textures.

The light-to-surface vector 800 can also be specified as an interpolated vertex parameter. That is, if the position of the surface is perturbed with respect to the light source 110, such as to achieve a variation in the surface, the position of the light source 110 can be subtracted from the object fragment's perturbed surface position to obtain the light-to-surface vector 800. For example, to render object fragment 504a of the plane 504, the light-to-surface vector 800 is determined by subtracting the position of the light source 110 from the position of the object fragment 504a.

Once the light-to-surface vector 800 is determined, the components of the light-to-surface vector 800 are analyzed to determine which component has the largest absolute value. The component having the largest absolute value corresponds to the cube face of shadow cube texture map 500 located between the light source and the object fragment. Specifically, the cube face corresponding to the axis of the component having the largest absolute value, in the direction corresponding to the sign of the component, is the cube face that is selected for rendering the object fragment.

For example, in FIG. 8, if the light-to-surface vector 800 had an S component of 1, a T component of −40, and an R component of 5 (i.e., [1,−40,5]), the component having the largest absolute value is the T component, which has an absolute value of 40. Hence, either the +y cube face 500b or the −y cube face 500a will be used for rendering. In this case, the −y cube face 500a is selected for rendering because the sign of the T component is negative. Thus, embodiments of the present invention advantageously determine shading using a single shadow texture lookup.

Once the proper cube face is selected, a projection is performed to determine which location in the selected cube face shadow map to use for rendering the object fragment. More specifically, the light-to-surface vector 800 component having the largest absolute value can approximate the z axis for rendering the object fragment. Hence, the remaining components of the light-to-source vector 800 are converted into corresponding SC and TC components of the selected cube face shadow texture. The light-to-surface vector 800 component having the largest absolute value is used to index into a table that indicates which coordinate to use for SC and TC. Table 1 shows an example of a table that can be used to determine which coordinate to use for SC and TC.

TABLE 1

| Selected Face | SC | TC |
| --- | --- | --- |
| +x | −rz | −ry |
| −x | +rz | −ry |
| +y | +rx | +rz |
| −y | +rx | −rz |
| +z | +rx | −ry |
| −z | −rx | −ry |

Hence, to calculate the projected coordinates for the cube face shadow buffer the following equations can be used:

$$S' = SC * 1/MA, \quad (1)$$

$$T' = TC * 1/MA, \quad (2)$$

where S' and T' are the 2D projected coordinates for the selected cube face shadow texture and MA is the absolute value of the largest component of the light-to-surface vector 800. In the example of FIG. 8, MA=abs (y coordinate)=40.

The projected S' and T' values are then normalized to match the normalized space of the cube face shadow texture using application specified Scale and Bias values. As mentioned previously, there are several different ways to select Scale and Bias values. In one embodiment, a global Scale and Bias value that affects all textures (or just those textures which have cube maps) can be selected. In another embodiment, a unique Scale and Bias value can be selected for each different texture. In a further embodiment, a unique Scale and Bias value can be selected for each cube face of each texture. In one embodiment, the Scale and Bias values are determined by the following equations:

$$\text{Scale} = -(\text{Far}*\text{Near})/(\text{Far}-\text{Near}), \quad (3)$$

$$\text{Bias} = \text{Far}/(\text{Far}-\text{Near}), \quad (4)$$

where Far is the range from the light source 110 to the light source's far plane and Near is the range from the light source 110 to the light source's near plane, which is the select cube face. In addition, the range from the object fragment to the light source is determined using the MA component. Hence, to transform the S' and T' coordinates into the normalized space of the selected cube face shadow buffer the following equations are used:

$$S''=(S'+1.0)*0.5, \quad (5)$$

$$T''=(T'+1.0)*0.5, \quad (6)$$

$$R''=(1/MA*\text{Scale})+\text{Bias}, \quad (7)$$

where S" and T" have been scaled and biased to a 0.0 to 1.0 texture coordinate range used to compute the addresses of texels within the selected cube texture map and R" is the depth of the object fragment projected and viewport-transformed to the viewing volume of the selected texture.

Once the projected and normalized S", T", and R" values are determined, the normalized range value stored at location S", T" within the selected cube face shadow texture is examined. In particular, the range value stored at location S", T" is compared with the normalized range value R" for the object fragment being rendered. For example, if the stored ranged value is less than range value R" for the object fragment, the object fragment is occluded by an object closer to the light source. Otherwise, no occluding objects are located between the object fragment and the light source and the object fragment is not shaded. For example, when rendering object fragment 504a in FIG. 8, the normalized range from the light source 110 to the object fragment 504a is compared to the normalized range value stored in the cube face 500a shadow texture. However, the range value stored in cube face 500a shadow texture will be the normalized range from the light source 110 to the object fragment 502a of sphere 502 because it is closest to the light source 110. Hence, the normalized range from the light source 110 to the object fragment 504a will be larger than the normalized range stored in the cube face 500a shadow texture. As a result, object fragment 504a will be shaded. In one aspect, the shadow values can be fractional values, thereby giving the shadows a softer edge.

Combined with vertex and/or pixel processor arithmetic, the Scale and Bias values allow an application to obtain essentially the same output (for the same inputs) as would be obtained through the regular projection, and viewport transformation pipeline. That is, the Scale and Bias values account for the projection and viewport transformations. Hence, a vertex and/or pixel shader program executing on a vertex and/or pixel processor can perform the model and view matrix multiplications. The embodiments of the present invention can replicate the projection and viewport transformations that map the light space z value to the normalized 0.0 to 1.0 value, which is actually stored into each cube face shadow texture. Hence, the Scale and Bias values, combined with the side divide reciprocal (1/MA), replicate the entire projection and viewport transformation.

Figure 9:
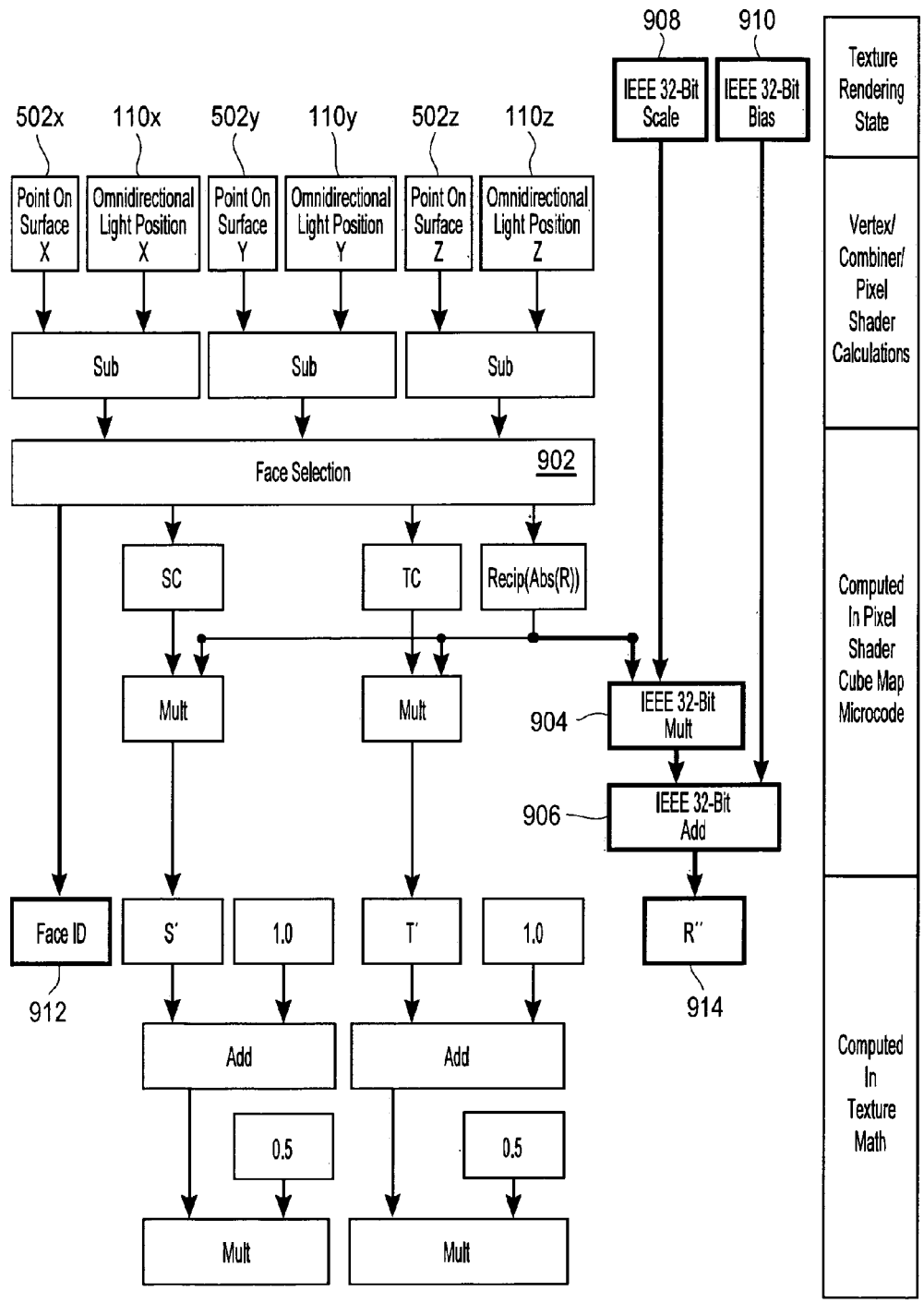
FIG. 9 is a block diagram showing a system 900 for performing omnidirectional shadow texture mapping, in accordance with an embodiment of the present invention.

FIG. 9 is a block diagram showing a system 900 for performing omnidirectional shadow texture mapping, in accordance with an embodiment of the present invention. The system 900 includes a plurality of components utilized for performing omnidirectional shadow texture mapping, including a face selection component 902, a 32-bit multiplier component 904, and a 32-bit adder component. The face selection component 902, 32-bit multiplier component 904, and 32-bit adder can all be embodied in a pixel processor or any other graphic processing component capable of performing the described operations.

Further, the system 900 includes an enhanced cube map transformation that generates a face_id index for selecting the depth buffer from the plurality of depth buffers, 2D texture coordinates (S',T') for computing addresses to select individual texels from the plurality of depth texels that is the selected depth buffer, and a depth range value to be compared against the range stored within the selected depth buffer.

In operation, the texture unit receives the face identified, the 2D texture coordinates (S',T'), and the depth value (R'). The texture unit computes the address(es) of the texels corresponding to the texture coordinates (S,T), obtains the stored range values and compares them against the R' value and replaces the fetched depth values with one of two different colors based on the outcome of the comparison. The texture unit applies filtering as it does in ordinary texture processing and returns the resulting color value to the pixel processor.

The system 900 receives the 3D coordinates of an object fragment 502x, 502y, and 502z, and the 3D components of an omnidirectional light source 110x, 110y, 110z. In addition, the system 900 receives a 32-bit Scale value 908 and a 32-bit Bias value 910. The light source 3D coordinates are subtracted from the object fragment 3D coordinates, and the resulting light-to-surface vector is provided to the face selection component 902. Although the light-to-surface vector has been described in terms of vector subtraction, it should be noted that the light-to-surface vector can be generated by any method which provides a vector from the position of the light source to the position of the object fragment that is being rendered.

The face selection component 902 then computes the shadow cube texture map face between the object fragment and the light source using the light-to-surface vector. The resulting cube face ID 912 is provided to the texture mapper. The face selection component 902 also computes the SC and TC values using the light-to-surface vector, as described previously with reference to FIG. 8. In addition, the reciprocal of the light-to-surface vector component having the largest absolute value (1/MA) is computed and provided to the 32-bit multiplier 904.

The SC and TC values are multiplied by 1/MA and the resulting S' and T' values are provided to the texture mapper. In addition, 1/MA is multiplied by the 32-bit Scale value and the product added to the 32-bit Bias value. The resulting R" 914 value is also provided to the texture mapper. The texture mapper then normalizes the S' and T' values by adding 1.0 to the values and multiplying the sums by 0.5. The texture mapper then uses the normalized S" and T" values to index into the light source cube face shadow texture corresponding to the cube face ID 912. The normalized range value stored at S", T" in the selected cube face shadow texture then is compared to the R" value for the object fragment to determined shading. In this manner, embodiments of the present invention perform omnidirectional shading using a single texture lookup.

Embodiments of the present invention may be implemented using any type of integrated circuit logic, state machines, or software driven computer-implemented operations. By way of example, a hardware description language (HDL) based design and synthesis program may be used to design the silicon-level circuitry necessary to appropriately perform the data and control operations in accordance with one embodiment of the present invention.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for rendering pixels, comprising:
    accessing, within an electronic system, a plurality of depth buffers corresponding to a light source, each depth buffer including depth data from a perspective of the light source;
    selecting a particular depth buffer from the plurality of depth buffers based on a location of an object fragment in relation to the light source, wherein the selecting is operable to be based on a perturbed surface of the object fragment, wherein the perturbed surface of the object fragment corresponds to a variation in a surface of a plane; and
    rendering a pixel corresponding to the object fragment utilizing the selected depth buffer, wherein the selected depth buffer is operable for use in shading the pixel.

2. A method as recited in claim 1, wherein the plurality of depth buffers are defined using a shadow texture map, wherein the shadow texture map defines a virtual object, wherein each side of said virtual object corresponds to a perspective of the light source.

3. A method as recited in claim 2, wherein each plane of the shadow texture map is associated with an axis of a three-dimensional coordinate system.

4. A method as recited in claim 3, wherein the particular depth buffer is selected utilizing a vector.

5. A method as recited in claim 4, wherein the vector is defined from the light source to the object fragment.

6. A method as recited in claim 4, wherein the vector is defined from the object fragment to the light source.

7. A method as recited in claim 4, further comprising the operation of selecting a component of the vector having a larger absolute value than other components of the vector.

8. A method as recited in claim 7, further comprising the operation of selecting the particular depth buffer that corresponds to the plane of the shadow texture map associated with an axis of the selected component.

9. A method as recited in claim 1, wherein each depth buffer is a shadow texture.

10. A method as recited in claim 1 wherein said light source is an omnidirectional light source.

11. A method as recited in claim 10, wherein said processing comprises rendering said object fragment for the omnidirectional light source using a single texture lookup.

12. A method as recited in claim 2, wherein said virtual object comprises a virtual cube.

13. A graphics sub-system comprising:
    a plurality of depth buffers, each depth buffer able to store depth data from a perspective of a light source;
    a pixel processor operable to select a particular depth buffer from the plurality of depth buffers based on a location of a pixel in relation to the light source, wherein said pixel processor is further operable to select said particular depth buffer based on a perturbed surface of the object fragment, wherein the perturbed surface of the object fragment corresponds to a variation in a surface of a plane; and
    a texture unit coupled to the pixel processor and operable to process the pixel based on the depth data in the particular depth buffer, wherein the particular depth buffer is operable for use in shading the pixel.

14. A graphics sub-system as recited in claim 13, wherein the pixel processor receives a vector defining a relationship between said light source and the pixel, and wherein said pixel processor selects said particular depth buffer based on said vector.

15. A method as recited in claim 14, wherein said vector comprises an interpolated vertex parameter.

16. A graphics sub-system as recited in claim 14, wherein the pixel processor selects a component of the vector having a larger absolute value than other components of the vector.

17. A graphics sub-system as recited in claim 13, wherein the plurality of depth buffers define a virtual object, wherein each side of said virtual object corresponds to one of said perspectives of said light source.

18. A graphics sub-system as recited in claim 17, wherein said virtual object comprises a virtual cube.

19. A graphics sub-system as recited in claim 18 wherein each plane of the virtual object is associated with an axis of a three-dimensional coordinate system.

20. A graphics sub-system as recited in claim 13 wherein said light source is an omnidirectional light source.

* * * * *